Aug. 6, 1957    H. E. TEMPLE    2,801,728
ARTICLE TRANSFER AND GROUPER APPARATUS
Filed Oct. 5, 1955    4 Sheets-Sheet 3
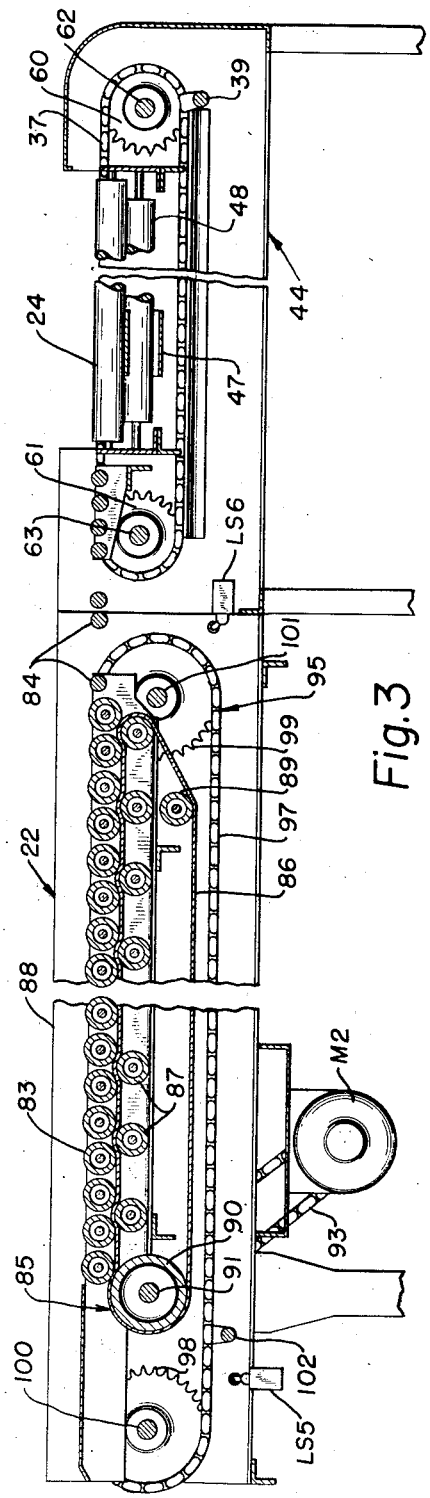
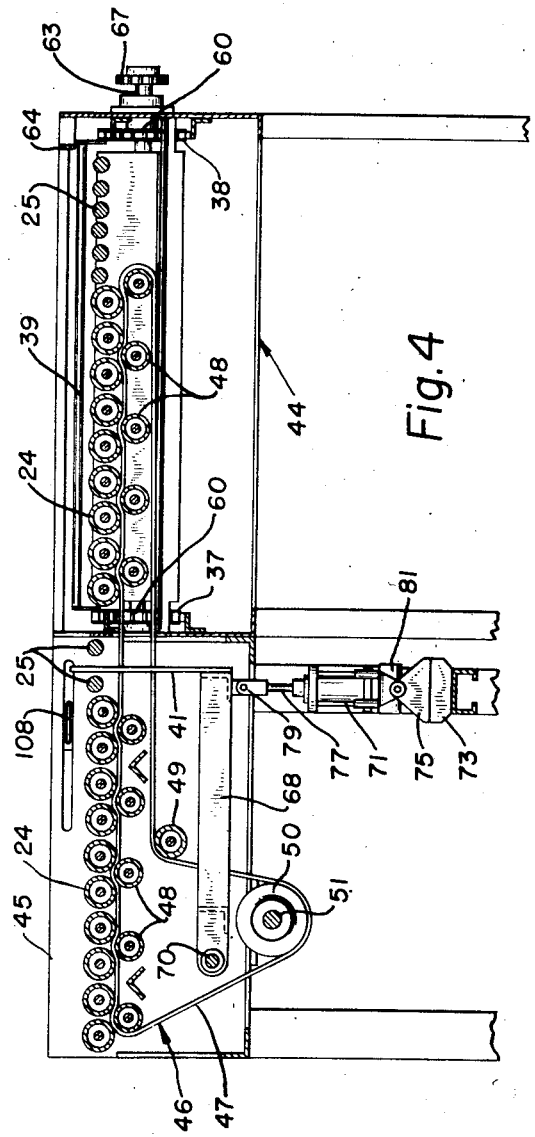
INVENTOR.
Hiram E. Temple
BY
Otto Moeller
Attorney Aug. 6, 1957  H. E. TEMPLE  2,801,728
ARTICLE TRANSFER AND GROUPER APPARATUS
Filed Oct. 5, 1955  4 Sheets-Sheet 4

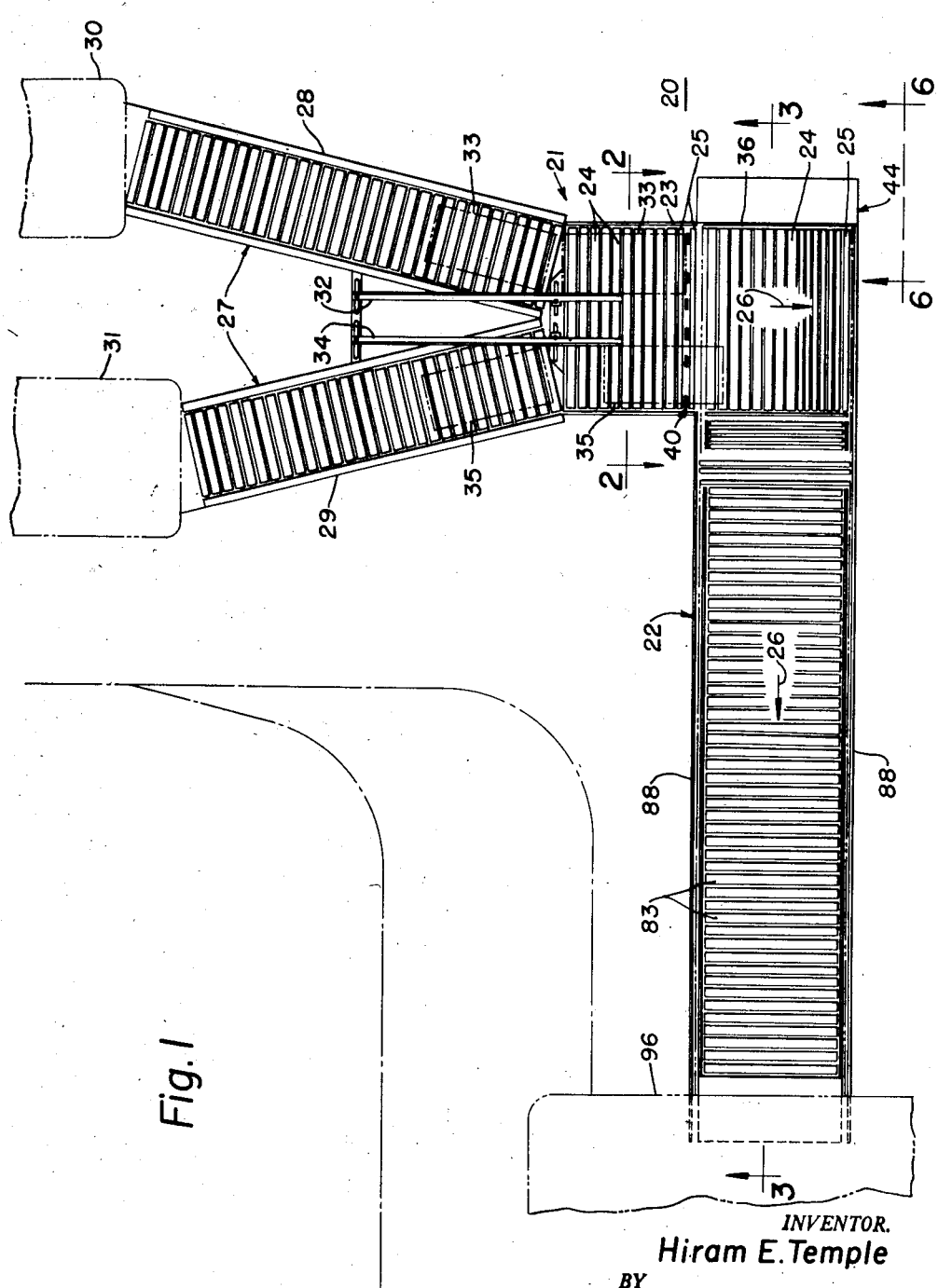

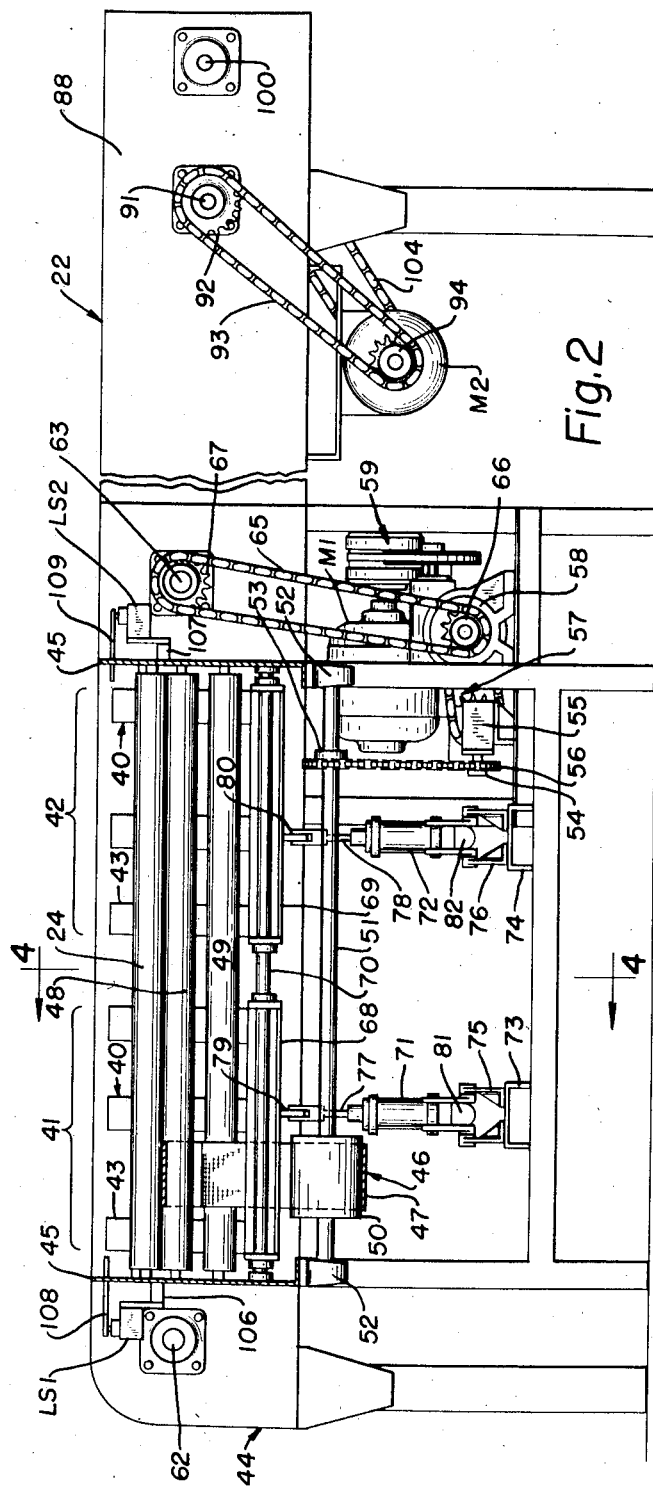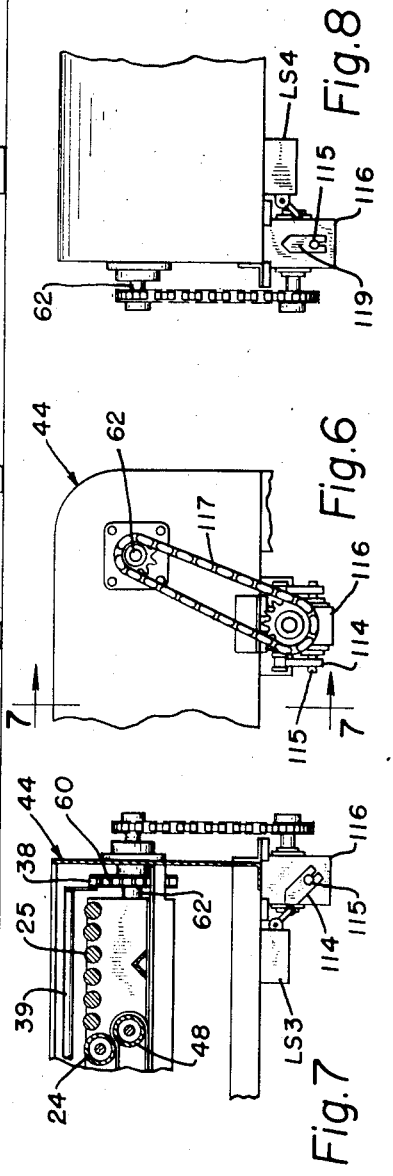

INVENTOR.
Hiram E. Temple
BY
Otto Moeller
Attorney

United States Patent Office 2,801,728
Patented Aug. 6, 1957

2,801,728

ARTICLE TRANSFER AND GROUPER APPARATUS

Hiram E. Temple, York, Pa., assignor, by mesne assignments, to Capitol Products Corporation, a corporation of Pennsylvania Application October 5, 1955, Serial No. 538,625

7 Claims. (Cl. 198—40)

The present invention relates in general to conveyor systems and, more particularly, to a conveyor system having inlet conveying means and outlet conveying means arranged at right angles and having transfer means movable transversely of the inlet conveying means and in the direction of movement of the outlet conveying means for transferring articles from the inlet conveying means to the outlet conveying means. The invention finds particular utility in the baking industry for handling baking pans, and is considered hereinafter in such connection as a matter of convenience, it being understood that the invention is also susceptible of other applications.

An object of the invention is to provide a conveyor system of the character hereinbefore suggested in which the inlet conveying means comprises a pair of inlet conveyors, two escapement means being respectively associated with the inlet conveyors and each adapted to pass one article at a time to the transfer means, and wherein means is provided for operating the two escapement means in timed relation with the transfer means so that an article may be delivered from each of the inlet conveyors to the transfer means for simultaneous conveyance of the two articles by the transfer means to the outlet conveyor. Ancillary thereto, it is an object of the invention to provide means correlating the operation of the two escapement means with the transfer means so that articles released by the escapement means cannot strike the transfer means as it is moving across the inlet conveying means.

Another object is to provide counting means for counting the articles released by the escapement means, and control means associated with the counting and escapement means operative when a predetermined number of articles have been released, to render the escapement means ineffectual for releasing further articles to the transfer means.

Another object is to provide outlet conveyor means for conveying therefrom as a group, the predetermined number of counted articles delivered thereto by the transfer means, and control means responsive to the outlet conveyor means upon conveyance therefrom of a group of articles for resetting the counting means to effect release of a succeeding predetermined number of articles by the escapement means.

Another object is to provide outlet conveyor means which includes continuously operating conveying elements for moving articles therealong as they are delivered thereto by the transfer means, and which also includes an intermittently operated sweep member traveling at a sufficiently higher speed than the conveying elements to discharge the articles from the outlet conveyor means in a consolidated group. By providing for movement of the articles along the outlet conveyor means when they are engaged by the faster moving sweep member, jarring of articles on the outlet conveyor means is minimized, and smoother operation results. A related object is to provide control means responsive to the counting means, when it has counted out a predetermined number of articles, for initiating operation of the sweep member of the outlet conveyor means.

The foregoing objects and advantages of the present invention, together with various other objects and advantages thereof which will become apparent, may be attained with the exemplary embodiment of the invention which is described in detail hereinafter and which is illustrated in the accompanying drawings.

Referring to the drawings:

Figure 1 is a plan view of a conveyor system with article transfer means embodying the invention;

Figure 2 is a sectional view through the inlet conveyor means taken on the line 2—2 of Figure 1, with the outlet conveyor means shown in elevation;

Figure 3 is a sectional view taken on the line 3—3 of Figure 1;

Figure 4 is a sectional view taken on the line 4—4 of Figure 2;

Figure 6 is an enlarged fragmentary view in elevation taken on line 6—6 of Figure 1;

Figure 7 is a sectional view taken on the line 7—7 of Figure 6;

Figure 8 is an end view of the portion of the apparatus shown in Figure 6 and viewed from the right side thereof.

Figure 9:
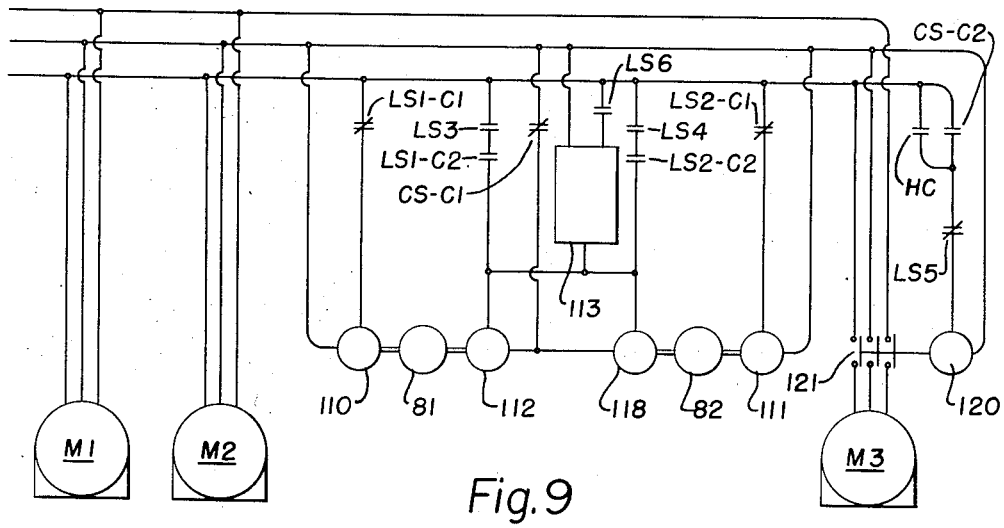
Figure 9 is a diagrammatic view of an electric circuit incorporated in the invention.

Referring particularly to Figure 1 of the drawings, the conveyor system of the invention is indicated as a whole by the numeral 20 which includes an inlet conveyor 21 and an outlet conveyor 22. The inlet conveyor 21 includes an inlet conveyor section 23 which includes driven rolls 24, and intermediate and terminal idling rolls 25, the rolls 24 being driven in a manner to be hereinafter described. The arrows 26 indicate the directions of movement of the inlet conveyor section 23 and the outlet conveyor 22, from which it will be seen that the outlet conveyor 22 extends transversely of the inlet conveyor section 23 and is adapted to receive articles therefrom. The outlet conveyor 22 registers with those driven rolls 24 and the terminal idling rolls 25 which define the downstream end portion of the inlet conveyor section 23.

The inlet conveyor 21 also includes an article feeding conveyor section 27 including two conveyors 28 and 29 disposed laterally of one another and having their delivery ends in juxtaposition and registering with the receiving end of the inlet conveyor section 23 to discharge articles onto the inlet conveyor section 23 in two spaced side by side rows. The conveyors 28 and 29 may communicate at their receiving ends with dough moulding and panning machines 30 and 31, respectively, for transporting pans of dough to the inlet conveyor section 23. Such dough moulding and panning machines are well known and since the construction thereof forms no part of the present invention, they are merely diagrammatically shown in the drawings and are not herein described. The conveyors 28 and 29 may be of any suitable type, being shown as roller conveyors for purpose of illustration, and preferably being power driven in suitable and conventional manner. Adjustably mounted guide bar 32 guides pans 33 from conveyor 28 onto one side of the longitudinal medial vertical plane of the inlet conveyor section 23 and adjustably mounted guide bar 34 guides pans 53 onto the other side of the longitudinal medial vertical plane of the inlet conveyor section 23.

The conveyor system 20 also includes transfer means 36 movable transversely of the inlet conveyor section 23 across its downstream end portion and in the direction of movement of the outlet conveyor 22 for transferring successive pairs of pans 33, 35 from the inlet conveyor section 23 to the outlet conveyor 22, or for transferring successive single pans 33 or 35 if there is a break in the delivery of pans from one or the other of the conveyors 28, 29. The transfer means 36 comprises a pair of endless chains 37 and 38 disposed respectively at opposite ends of the downstream end portion of the inlet conveyor section 23, with the upper runs of the chains 37 and 38 being disposed at a level below the pan supporting surfaces of the rolls 24 and 25. Supported by the chains 37 and 38, as best shown in Figure 4, is a sweep bar 39 which is disposed above the level of the pan supporting surfaces of the rolls 24, 25 when being moved by the chains 37 and 38 along their top runs whereby the sweep bar 39 transfers pans to the outlet conveyor 22.

Associated with the inlet conveyor section 23 upstream from the transfer means 36 is an escapement means 40 for feeding pans one at a time from each of the rows of pans 33 and 35. The escapement means 40 includes a pair of side by side discontinuous gates 41 and 42, each having a plurality of upwardly extending fingers 43 disposed in the spaces between the intermediate idling rolls 25, all as best shown in Figures 2 and 4. As will be discussed hereinafter in greater detail, the gates 41 and 42 are movable between an extended position wherein the fingers 43 are disposed in the path of pans on the inlet conveyor section 23 to intercept such pans, and a retracted position wherein they are withdrawn downwardly out of such paths to permit pans to pass to the transfer means 36. As also described hereinafter, actuating and control means is provided for operating the transfer means 36 and the escapement means 40 in timed relation so that the gates 41 and 42 pass a pan to the transfer means only after the transfer means has transferred a preceding pan to the outlet conveyor 22 and before the transfer means is in position to transfer the succeeding pan.

The inlet conveyor section 23, the transfer means 36, the escapement means 40 and the actuating means are carried by a frame which is designated generally by the numeral 44. The frame 44 includes two parallel frame members 45 on which the respective ends of the driven rolls 24 and the idling rolls 25 are rotatably mounted in any suitable manner, not shown. The driven rolls 24 are driven by any suitable means as by the friction drive 46. Referring particularly to Figures 2 and 4, the upper run of an endless belt 47 is urged into frictional engagement with a lower peripheral portion of each of the driven rolls 24 by a series of rolls 48 which are rotatably mounted at their respective ends in suitable manner on the frame members 45. The return run of the endless belt 47 passes over a rotatably mounted guide roll 49 and a pulley 50 mounted on the transverse shaft 51 supported at its ends in pillow blocks 52 subjacent the frame members 45.

The pulley drive shaft 51 for driving the belt 47 is actuated by motor M-1 through suitable drive connections including a sprocket 53 on the shaft 51, around which sprocket 53 and a sprocket 54 of an angle gear unit 55 is trained a sprocket chain 56. Suitable sprocket and chain means, indicated generally by the numeral 57, connects the angle gear unit 55 with a speed reducer 58, which in turn is connected to the motor M-1 shaft through a suitable variable speed pulley drive, indicated generally by the numeral 59.

The chains 37 and 38 which carry the sweep bar 39 of the transfer means 36 are trained around sprockets 60 and 61 fixed on shafts 62 and 63, respectively, which are carried by suitable bearings on the frame 44. As previously stated, the upper runs of chains 37 and 38 are disposed at a level below the pan supporting surfaces of the rolls 24 and 25 so that a pan supported by the rolls 24 and 25 in the path of the sweep bar 39 is not engaged by the chains 37 and 38, but only by the sweep bar. Thus a pan or pans on the rolls 24 and 25 in the path of the sweep bar 39 remain stationary until the sweep bar comes around and engages the pans, a stop or bumper 64 being provided to keep the pans from being moved off the end of the inlet conveyor section 23.

The transfer means 36 is also driven by the motor M-1 through the speed reducer 58, a chain 65 being trained around a sprocket 66 on the speed reducer shaft and a sprocket 67 on the shaft 63 of the transfer means 36. The motor M-1 operates continuously for continuous operation of the transfer means 36 and the inlet conveyor section 23.

The gates 41 and 42 are secured to one end of frame like levers 68 and 69, respectively, the opposite ends of said frame like levers 68 and 69 being pivotally mounted on a transversely extending shaft 70 supported at its ends on the frame members 45. The gates 41 and 42 are movable independently of each other between an extended position wherein the fingers 43 project above the level of the conveying surface of the rolls 24, 25 of the inlet conveyor section 23, as shown in Figures 2 and 4, whereby to halt the advance of pans, and a retracted position wherein the fingers 43 are withdrawn to permit advance of pans. The gates 41 and 42 are moved between such positions by air cylinders 71 and 72, respectively. Air cylinders 71 and 72 are pivotally supported on brackets 73 and 74, respectively, by the pivotal mountings 75 and 76, respectively, the brackets 73 and 74 being rigidly secured to the frame 44. The free ends of the piston rods 77 and 78 are pivotally connected at 78 and 80, respectively, to the gates 41 and 42, respectively. Solenoid operated valves 81 and 82 control admission of air to one end or the other of the air cylinders 71 and 72, respectively, for raising or lowering the gates 41 and 42, respectively. The control system for the solenoid operated valves 81 and 82 will be described hereinafter in connection with the electrical diagram.

Figure 5:
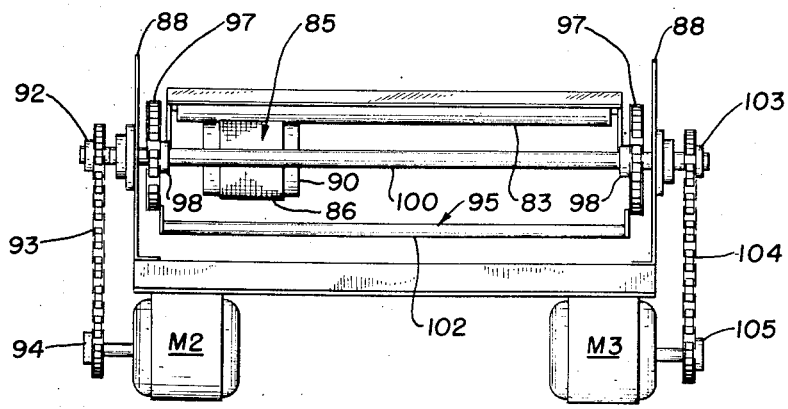
Figure 5 is an end elevation of the outlet conveyor means viewed from the left end of Figure 3.

The sweep bar 39 of the transfer means 36, as previously stated transports the pans from the downstream end portion of the inlet conveyor section 23 to the outlet conveyor 22. The outlet conveyor 22 may be of any suitable type, being shown as a roller conveyor for purpose of illustration. For reasons hereinafter explained, the outlet conveyor 22 is preferably of the power driven type and includes a series of driven rolls 83. For practical construction reasons, a short section of the outlet conveyor 22 adjacent the transfer means 36 is provided with idler rolls 84. This idler roll section of the outlet conveyor 22 is sufficiently short so that the momentum imparted to the pans by the sweep bar 39 of the transfer means 36 will carry them across the idler roll section onto the driven roll section of the outlet conveyor. The rolls 83 may be driven in any suitable manner, as by the friction drive 85. Referring to Figures 2, 3 and 5, the upper run of an endless belt 86 is urged into frictional engagement with a lower peripheral portion of each of the driven rolls 83 by a series of rolls 87. The rolls 87, as also the rolls 83 and 84, are rotatably mounted at their respective ends in suitable manner on the parallel frame members 88, at opposite sides of the outlet conveyor 22. The return run of the endless belt 86 passes over a rotatably mounted guide roll 89 and a pulley 90 mounted on the transverse shaft 91 journaled in suitable bearings on the frame members 88. One end of shaft 91 projects through one of the frame members 88, and on its projecting end is secured a sprocket 92. A sprocket chain 93 is trained over sprocket 92 and a sprocket 94 on the motor shaft of motor M-2 whereby the driven rolls 83 of outlet conveyor 22 are continuously operated.

The outlet conveyor 22 also includes a transfer sweep means 95, arranged to operate intermittently, as hereinafter explained, when a predetermined number of pans have been transferred by the transfer means 36 to the outlet conveyor 22, to sweep this predetermined number of pans as a group from the outlet conveyor. In this manner pans are swept from the outlet conveyor in successive groups to, for example, a loading device 96 for loading successive groups of pans on respective shelves of a pan rack. The loading device 96 constitutes no part of the present invention and is therefore shown diagrammatically and is not described herein.

The transfer sweep means 95 comprises a pair of endless chains 97 disposed respectively at opposite sides of the outlet conveyor 22, trained around sprockets 98 adjacent one end of the outlet conveyor 22 and sprockets 99 adjacent the other end thereof. The sprockets 98 are carried by a shaft 100 which is rotatable in bearings on the frame members 88, and the sprockets 99 are carried by a shaft 101 which is also rotatable in bearings on the frame members 88. The upper runs of the chains 97 are disposed at a level below the pan supporting surfaces of the rolls 83 and 84. Supported by the chains 97 is a sweep bar 102 which is disposed above the pan supporting surfaces of the rolls 83 and 84 when being moved by the chains 97 along their top runs, whereby the sweep bar 102 transports a group of pans off the outlet conveyor 22. The sweep bar 102 moves upwardly from the lower to the upper runs of the chains 97 through the space between a pair of adjacent idler rolls 84. One end of shaft 100 projects through one of the frame members 88, and on its projecting end is secured a sprocket 103. A sprocket chain 104 is trained over sprocket 103 and a sprocket 105 on the motor shaft of motor M-3 whereby the transfer sweep means 95 is operated.

Reverting now to the means for controlling the movement of the gates 41 and 42 between extended and retracted positions, limit switches LS-1 and LS-2 are secured by brackets 106 and 107, respectively, to the respective frame members 45, as shown in Figure 2. The limit switches LS-1 and LS-2 are actuated by pivotally mounted rods 108 and 109, respectively, which are movable from an extended to a retracted position by pressure of pans thereagainst. The rods 108 and 109 are disposed forward of the gates 41 and 42, respectively, and normally project horizontally inward toward each other in extended position above the pan supporting surface of the rolls of the inlet conveyor section 23, so that the rod 108 is in the path of the row of pans 33 and the rod 109 is in the path of the row of pans 35.

In the normal or extended position of the rod 108, referring particularly to the electrical diagram of Figure 9, a contact C-1 of limit switch LS-1 is closed, completing a circuit and energizing coil 110, whereby solenoid operated valve 81 is moved to a position admitting air to the bottom of cylinder 71 to retain the gate 41 in raised or extended position to intercept a pan 33. In similar manner, a contact C-1 of limit switch LS-2 completes a circuit energizing coil 111 to actuate solenoid operated valve 82 to retain the gate 42 in raised or extended position.

When a pan 33 engages the rod 108 moving it to its retracted position, contact C-1 of limit switch LS-1 opens, breaking the circuit to and deenergizing coil 110, so that the valve 81 can be moved, under certain conditions to be hereinafter explained, to introduce air to the upper end of cylinder 71 to retract the gate 41. Movement of rod 108 to its retracted position closes normally open contact C-2 of limit switch LS-1, which contact C-2 is in a circuit with the coil 112, the coil 112 when energized moving solenoid operated valve 81 to a position effecting retraction of the gate 41 by the cylinder 71. However, in the circuit to coil 112 there is, in addition to contact C-2 of limit switch LS-1, a normally open limit switch LS-3 controlled by the transfer means 36, and a contact C-1 of a counter controlled switch CS, all three of which must be closed to energize coil 112 to effect retraction of gate 41 by the cylinder 72 and permit a pan 33 to pass to the transfer means 36.

The counter 113 may be of any type suitable for its intended function such as Eagle Counter #HZ50B6, manufactured by Eagle Signal Corporation, Moline, Illinois. As best shown in Figures 6 and 7, normally open limit switch LS-3 is arranged to be momentarily closed when engaged by the free end of an arm 114 mounted to be rotated by a shaft 115 of a gear reducer 116. The gear reducer 116 is operatively connected through sprocket and chain drive 117 with an extension of the shaft 62, which as previously described is associated with the operating means for the transfer sweep bar 39. The arm 114 thus rotates in timed relation with the sweep bar 39 and is arranged to make one revolution for each cycle of the sweep bar 39. The arm 114 is, in addition, disposed on the gear reducer shaft 115 so that it contacts the limit switch LS-3 at the time that the sweep bar has passed just beyond the path of travel of pans 33 on the transfer means 36, so that as explained more fully hereinafter, engagement of a pan with the end of the sweep bar 39 is obviated.

From the above it will be apparent that the gate 41 is only retracted when a pan engages the rod 108 to close contact C-2 of limit switch LS-1, when the sweep bar 39 has reached a particular position at which the limit switch LS-3 closes momentarily, and when the contact C-1 of counter controlled switch CS is closed. Under these conditions a pan 33 is released for advancement to the transfer means 36. At the same time a circuit through limit switch LS-3 and contact C-2 of limit switch LS-1 is momentarily completed to the counter 113, causing the counter to record the pan. The counter 113 is pre-set and arranged, so that when a desired number of pans have been recorded, the contact C-1 of counter controlled switch CS is caused to open. For purpose of illustration let it be assumed that counter 114 has been set to count out seven pans, so that after the seventh pan has been passed to the transfer means, the contact C-1 of counter controlled switch CS opens. This breaks the circuit to the coil 112, so that even if a succeeding pan has through engagement with rod 108 caused contact C-2 of limit switch LS1 to close and the sweep bar 39 is in proper position to close switch LS-3, the gate 41 is nevertheless not retracted since the circuit for energizing the coil 112 has not been completed. This presupposes that the gate 41 was in its extended position at that time, and this is actually the case since as soon as the first pan 33 passes the rod 108 the latter returns to its normal extended position, closing the circuit to and energizing coil 110 as previously explained, and the coil 112 being de-energized, the solenoid operated cylinder 71 is actuated to raise or extend the gate 41 and intercept the next succeeding pan 33.

The control means hereinabove described has, for convenience, been confined largely, to the gate 41 and the row of pans 33. Similar control means are provided for the gate 42 and the row of pans 35. However, the one counter 113 is arranged to count the pans delivered from both rows of pans 33 and 35. When a pan 35 engages and moves rod 109 to its retracted position, contact C-1 of limit switch LS-2 opens, de-energizing coil 111. At the same time contact C-2 of limit switch LS-2 closes and if limit switch LS-4 and contact C-1 of counter operated switch CS is closed, coil 118 is energized whereby cylinder 72 is actuated through solenoid controlled valve 82 to retract the gate 42 and permit a pan 35 to pass to the transfer means 36. This pan is counted by the counter 113 in the same manner as described above in connection with the counting of pans 33. Limit switch LS-4 is operated by an arm 119, Figure 8, which is mounted on the gear reducer shaft 115, on the side opposite the gear reducer 116 from the arm 114, the arm 119 being operated in timed relation with the sweep bar 39 in the same manner as previously described in connection with arm 114. The arm 119 is so disposed on the shaft 115 that it engages limit switch LS-4 at the time that the sweep bar 39 has passed just beyond the path of travel of pans 35 on the transfer means 36, so that engagement of a pan 35 with the end of the sweep bar 39 is obviated.

Assume that there is a pan 33 and a pan 35 on the transfer section of the inlet conveyor 23, then the transfer sweep bar 39 as it moves along the top run of the chains 37 and 38 engages pan 33 pushing it ahead until pan 33 engages pan 35, after which both pans 33 and 35 will be pushed ahead onto the outlet conveyor. During such movement of the sweep bar 39 and just after it has passed beyond the path of a succeeding pan 33, the gate 41 will be retracted if at that time a pan 33 has engaged the rod 108 thereby closing contact C–2 of limit switch LS–1 and if at that time the contact C–1 of counter controlled switch CS is closed, and a pan 33 is thereupon moved by the rolls 24 onto the transfer section of the infeed conveyor 23. When the sweep bar 39 has passed just beyond the path of a succeeding pan 35, such succeeding pan 35 is then similarly moved by the rolls 24 onto the transfer section of the infeed conveyor 23. The pans 33 and 35 just moved onto the transfer section of the infeed conveyor 23 will now be in position to be swept onto the outlet conveyor 21 on the next cycle of operation of the sweep bar 39. The rolls 24 operate at a speed so that the pans are conveyed into position on the transfer section of the inlet conveyor in advance of the next pushing cycle of the sweep bar 39, so that the pans will not engage the end of the sweep bar 39.

The pans delivered by the transfer sweep bar 39 onto the outlet conveyor 22 are advanced therealong by the driven rolls 83. As above explained, in the present specific example the counter 113 has been preset to count out seven pans, whereupon normally closed contact C–1 of counter controlled switch CS opens, and as explained above the gates 41 and 42 are prevented from being retracted even though limit switch LS–3 and contact C–2 of limit switch LS–1 be closed, and limit switch LS–4 and contact C–2 of limit switch LS–2 be closed.

At the same time, normally open contact C–2 of counter controlled switch CS closes whereby a circuit is established through normally closed limit switch LS–5, to energize the coil 120 and close normally open switch 121 to start the motor M–3 for operating the sweep bar 102. The outlet conveyor sweep bar 102 travels from its normal rest position, as shown in Figure 3, for a considerable distance along the lower runs of chains 97 before moving up on the top runs, during which period the transfer sweep bar 39 has had ample time to sweep the seventh pan onto the outlet conveyor 22 so that the outlet conveyor sweep bar 102 comes up behind the seventh pan and sweeps the group of seven pans off the outlet conveyor 22. As previously stated, the rolls 83 of the outlet conveyor 22 are preferably power operated, however, they are operated at a considerably lower speed than the sweep bar 102, for example, the rolls 83 may be operated to move the pans at 57 feet per minute while the sweep conveyor 102 operates at a speed of 110 feet per minute, whereby the seven pans of a group will be collectively discharged from the outlet conveyor 22 by the sweep bar 102. Since the pans are moving along the outlet conveyor at the time the sweep bar 102 engages them, such engagement will occur with a minimum of jarring and jolting of the pans while at the same time permitting them to be discharged as a group from the outlet conveyor.

Subjacent the upstream end of the outlet conveyor 22 is a limit switch LS–6 arranged to be momentarily engaged by the sweep bar 102 to close the same, completing a circuit to the counter 113, to reset the counter for counting out a next group of seven pans. When the counter 113 is thus reset, contact C–2 of counter controlled switch CS will open, however, the circuit to motor M–3 for operating the outlet conveyor sweep bar 102 is maintained through hold contact HC. Subjacent the downstream end of the outlet conveyor 22 is a limit switch LS–5 arranged to be momentarily engaged and opened by the sweep bar 102 after the sweep bar has discharged the group of seven pans. Momentary opening of limit switch LS–5 stops the motor M–3 for the sweep bar 102. Momentary opening of limit switch LS–5 causes the hold contact HC to open, and since contact C–2 of counter controlled switch CS is also open, the circuit to the motor M–3 remains broken even though limit switch LS–5 recloses as the sweep bar 102 overrides it. The apparatus is now ready to count out, transfer and group a next series of seven pans.

We claim:

1. In a conveyor system, inlet conveyor means for simultaneous conveyance of two rows of articles; outlet conveyor means extending transversely of said inlet conveyor means adapted to receive articles therefrom for conveyance therealong in a single row; transfer means including an endless chain carrying a sweep member traversing said inlet conveyor means in the direction of movement of said outlet conveyor means, for transferring articles from said inlet conveyor means to said outlet conveyor means; escapement means including a gate in the path of each row of articles upstream from said transfer means movable between an extended position wherein they are adapted to intercept articles being transported by said inlet conveyor means and a retracted position wherein they are out of the path of articles being transported by said inlet conveyor means; an actuator for each of said gates; means operative for energizing said actuators to retract said gate members in timed relation with said transfer means, said means including a control for each of said actuators responsive to presence of an article adjacent a respective gate and a control responsive to each traverse of said sweep member; said article actuated controls and said sweep member actuated control cooperating to energize said actuators for retracting one or both of said gates to release an article from one or both of said rows of articles to said transfer means for conveyance of one or both of said articles to said outlet conveyor means by said sweep member.

2. In a conveyor system, inlet conveyor means for simultaneous conveyance of a pluraliy of rows of articles; outlet conveyor means extending transversely of said inlet conveyor means adapted to receive articles therefrom for conveyance therealong in a single row; transfer means movable transversely of said inlet conveyor means and in the direction of movement of said outlet conveyor means for transferring articles from said inlet conveyor means to said outlet conveyor means; actuating means for said transfer means; a plurality of escapement means associated with said inlet conveyor means upstream from said transfer means for respectively passing one article at a time from a respective row of articles to said transfer means; an actuator for each of said escapement means; control means operatively connected with said transfer means adapted to energize each of said actuators to release an article by each of said plurality of escapement means for advancement by said inlet conveyor means to said transfer means for simultaneous conveyance thereby to said outlet conveyor means; and an article actuated control for each of said plurality of actuators for energizing a respective actuator to operate a respective escapement means to release an article only when an article of a respective row of articles is adjacent a respective escapement means.

3. In a conveyor system, inlet conveyor means; outlet conveyor means extending transversely of said inlet conveyor means and adapted to receive articles therefrom; transfer means movable transversely of said inlet conveyor means and in the direction of movement of said outlet conveyor means for transferring articles from said inlet conveyor means to said outlet conveyor means; escapement means associated with said inlet conveyor means upstream from said transfer means for passing articles to said transferring means; a counter for counting articles released by said escapement means to said transfer means; means controlled by said counter when a predetermined number of articles have been counted for rendering said escapement means inoperative to release further articles; means controlled by said counter, when said predetermined number of articles have been counted, for actuating said outlet conveyor means to move said predetermined number of articles therealong; and means responsive to actuation of said outlet conveyor means for resetting said counter to render said escapement means operative to release further articles.

4. In a conveyor system, inlet conveyor means, outlet conveyor means extending transversely of said inlet conveyor means and adapted to receive articles therefrom; transfer means movable transversely of said inlet conveyor means and in the direction of movement of said outlet conveyor means for transferring articles from said inlet conveyor means to said outlet conveyor means; escapement means associated with said inlet conveyor means upstream from said transfer means for passing articles to said transferring means; a counter for counting articles released by said escapement means to said transfer means; means controlled by said counter when a predetermined number of articles have been counted for rendering said escapement means inoperative to release further articles; said outlet conveyor means including a continuously operating conveyor for frictionally moving articles therealong as they are delivered thereto from said transfer means; said outlet conveyor means also including an intermittently operated sweep conveyor traversing said frictional conveyor and moving lengthwise thereof in the same direction and at a greater rate of speed for moving articles therealong in a consolidated group; means controlled by said counter, when said predetermined number of articles have been counted, for actuating said sweep conveyor.

5. A conveyor system according to claim 4 including means responsive to actuation of said sweep conveyor for resetting said counter to render said escapement means operative to release further articles.

6. In a conveyor system, inlet conveyor means for simultaneous conveyance of two rows of articles; outlet conveyor means extending transversely of said inlet conveyor means adapted to receive articles therefrom for conveyance therealong in a single row; transfer means including an endless chain carrying a sweep member traversing said inlet conveyor means in the direction of movement of said outlet conveyor means, for transferring articles from said inlet conveyor means to said outlet conveyor means; escapement means including a gate in the path of each row of articles upstream from said transfer means movable between an extended position wherein they are adapted to intercept articles being transported by said inlet conveyor means and a retracted position wherein they are out of the path of articles being transported by said inlet conveyor means; an actuator for each of said gates; an electrical circuit for controlling each of said actuators including a pair of series connected normally open switches in each of said circuits, one of each pair of series connected switches being responsive to presence of an article adjacent a respective gate to close the same, the other of each pair of series connected switches being responsive to a single traverse of said sweep member for closing the same, whereby upon closing of a pair of series connected switches its respective electrical circuit is closed to effect energization of its respective actuator to retract its respective gate to release an article from its respective row of articles to said transfer means.

7. A conveyor system as defined in claim 6, including a normally closed switch in each of said electrical circuits, and counter means for counting the articles released by said gates, said counter means adapted when a predetermined number of articles have been counted, to open said normally closed switches to render said actuators ineffective for retracting said gates preventing release of additional articles.

References Cited in the file of this patent

UNITED STATES PATENTS 2,728,466     Postlewaite _____ Dec. 27, 1955